US011236993B1

(12) United States Patent
Hall et al.

(10) Patent No.: US 11,236,993 B1
(45) Date of Patent: Feb. 1, 2022

(54) DEPTH SENSING USING A TIME OF FLIGHT SYSTEM INCLUDING A SCANNING BEAM IN COMBINATION WITH A SINGLE PHOTON AVALANCHE DIODE ARRAY

(71) Applicant: Facebook Technologies, LLC, Menlo Park, CA (US)

(72) Inventors: Michael Hall, Seattle, WA (US); Xinqiao Liu, Medina, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 859 days.

(21) Appl. No.: 16/000,892

(22) Filed: Jun. 6, 2018

Related U.S. Application Data

(60) Provisional application No. 62/517,064, filed on Jun. 8, 2017, provisional application No. 62/524,311, filed on Jun. 23, 2017.

(51) Int. Cl.
*G01C 3/08* (2006.01)
*G01B 11/22* (2006.01)
*G01S 7/4865* (2020.01)
*H04N 13/271* (2018.01)

(52) U.S. Cl.
CPC ............ *G01B 11/22* (2013.01); *G01S 7/4865* (2013.01); *H04N 13/271* (2018.05)

(58) Field of Classification Search
CPC ...... G01B 11/22; G01S 7/4865; H04N 13/271
See application file for complete search history.

(56) References Cited

U.S. PATENT DOCUMENTS

| 10,574,973 | B2 | 2/2020 | Hall et al. |
| 2016/0284743 | A1 | 9/2016 | Mellot et al. |
| 2017/0242109 | A1* | 8/2017 | Dussan ................... G01S 7/487 |
| 2019/0011567 | A1* | 1/2019 | Pacala ..................... G01S 17/10 |
| 2020/0319344 | A1 | 10/2020 | Ronchini Ximenes et al. |

FOREIGN PATENT DOCUMENTS

WO    WO2017/143217 A1  *  8/2017    ............. G01S 7/481

* cited by examiner

*Primary Examiner* — Mark Hellner
(74) *Attorney, Agent, or Firm* — Fenwick & West LLP

(57) ABSTRACT

A depth camera assembly (DCA) includes a light generator emitting a beam of light into a local area and a detector. The detector captures light from the beam reflected by objects in the local area to a portion of an array of pixels that each include a single photon avalanche diode (SPAD). The location of the portion of the array is based in part on the angle of the beam emitted from the projector. The DCA identifies a set of pixels of the array corresponding to the portion and selectively retrieves current generated from the reflected light by the pixels in the portion of the array without retrieving current generated by pixels in other portions of the array.

20 Claims, 7 Drawing Sheets

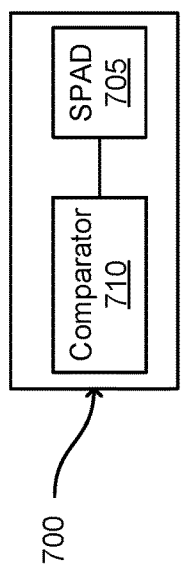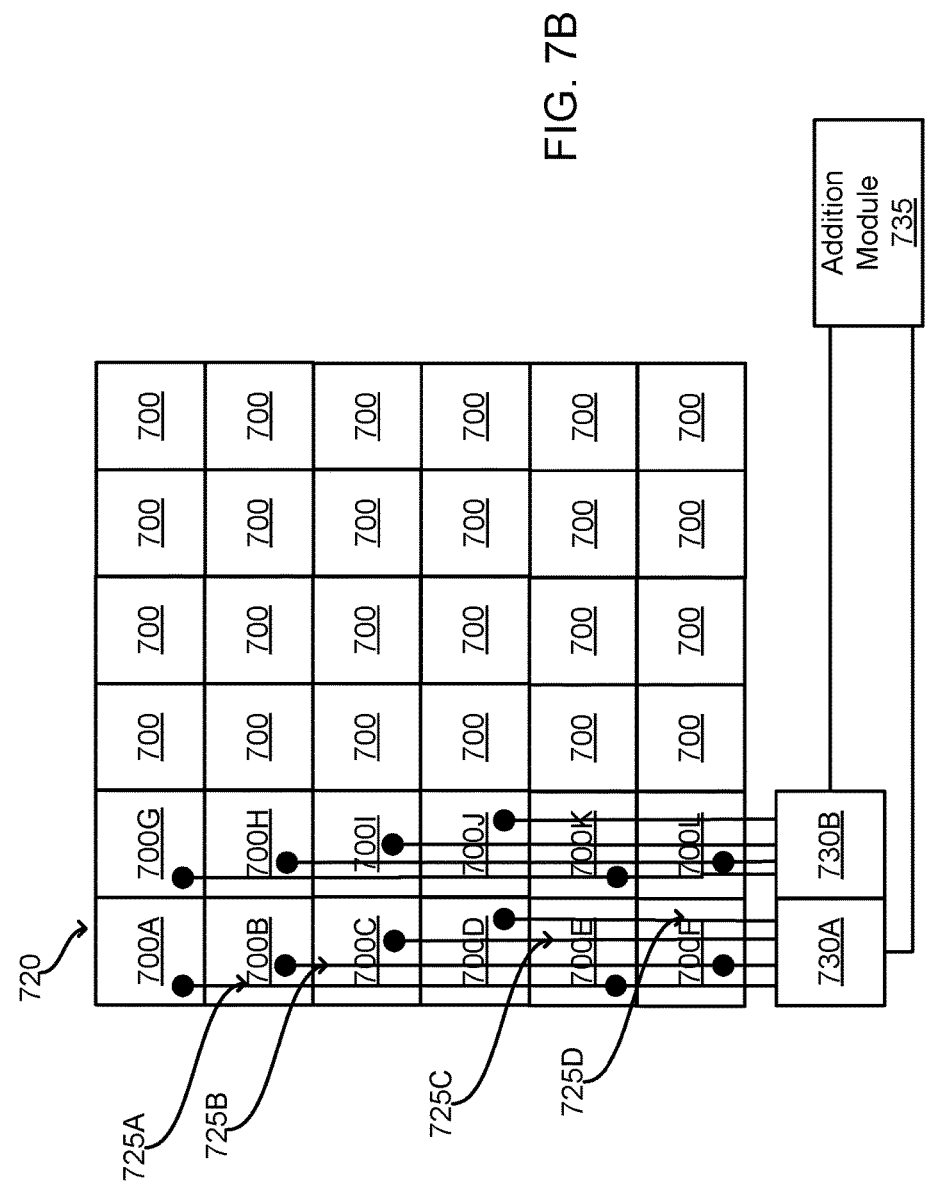

DEPTH SENSING USING A TIME OF FLIGHT SYSTEM INCLUDING A SCANNING BEAM IN COMBINATION WITH A SINGLE PHOTON AVALANCHE DIODE ARRAY

CROSS-REFERENCE TO RELATED APPLICATIONS

This application claims the benefit of U.S. Provisional Application No. 62/517,064, filed Jun. 8, 2017, and of U.S. Provisional Application No. 62/524,311, filed Jun. 23, 2017, each of which is incorporated by reference in its entirety.

BACKGROUND

The present disclosure generally relates to depth sensing, and specifically relates to single photon avalanche diode array and a scanning beam for depth sensing in virtual reality (VR) or augmented reality (AR) systems.

Mapping an environment with high accuracy and resolution allows generation or more immersive virtual reality (VR) or augmented reality (AR) content. Accurately mapping an environment surrounding a VR system or and AR system allows virtual objects to more realistically interact with real objects the environment surrounding the VR or AR system. For example, highly accurate mapping of an environment surround the VR or AR system allows a virtual object in a virtual environment to collide with real surfaces in the environment surrounding the VR or AR system or to appear occluded when the virtual object moves behind an opaque surface in the environment surrounding the VR or AR system.

To accurately map an environment surrounding a VR system or an AR system, the VR system or AR system includes a depth camera that is free of image or algorithm artifacts. For inclusion in a head mounted display of a VR system or an AR system, such as depth camera should have a small form factor and low power consumption. Conventional depth cameras use structured light, which projects known patterns into the environment surrounding a depth camera, or indirect time of flight, which indirectly measures a round trip travel time of light projected into the environment surrounding the depth camera and returning to pixels on a sensor array based on a phase delay of a modulated laser pulse projected into the environment surrounding the depth camera.

However, structured light commonly required the projected illumination pattern to be coded with local constellations that are later identified in a captured image. Having different constellations of the illumination pattern causes large portions of the captured image to be unilluminated, causing a majority of pixels in a sensor capturing the image to be unused. Additionally, sensitivity and accuracy of depth measurements using structured light depend on a separation between an emitter projecting the illumination pattern and the detector capturing the image of the projected illumination pattern, introducing a trade-off between accuracy and form factor of the depth camera assembly.

While using indirect time of flight allows a depth camera to measure depth of an object in the environment surrounding the depth camera independently using each pixel of a detector, light incident on a pixel of the detector may be from a combination of optical paths in the environment surrounding the depth camera. While this may be mitigated through certain techniques, such techniques are often computationally complex. Additionally, many indirect time of flight systems require capture of multiple images of the environment, which may be difficult to obtain while maintaining a sufficient signal to noise ratio over a short exposure time.

SUMMARY

A depth camera assembly (DCA) determines depth information for one or more objects in a local area surrounding the DCA. In various embodiments, the DCA is included in a head mounted display (HMD) of a virtual reality system or of an augmented reality system. The DCA includes a transmitter, a receiver, and a controller in various embodiments.

The transmitter is configured to illuminate the local area with outgoing light in accordance with emission instructions received from the controller. The transmitter comprises an illumination source and a beam steering assembly in various embodiments. The illumination source is configured to emit one or more optical beams. In some embodiments, the illumination source directly generates the one or more optical beams as polarized light, e.g., based on a polarizing element integrated into the illumination source or placed in front of the illumination source. In alternate embodiments, the illumination source generates the one or more optical beams as unpolarized light. Based on the emission instructions, the beam steering assembly deflects the one or more optical beams to generate outgoing light having a relatively large angular spread. The relatively large angular spread allows the outgoing light to provide a wide field-of-view for scanning of the one or more objects in the local area. In some embodiments, the outgoing light comprises one or more outgoing light beams.

The receiver is configured to capture, in accordance with receiving instructions from the controller, one or more images of the local area including reflected light including portions of the outgoing light reflected from objects in the local area. The reflected light captured by the receiver is reflected from the one or more objects in the local area. In various embodiments, the receiver comprises an imaging device including a detector that comprises a two dimensional array of pixels that each include a single photon avalanche diode (SPAD). Different pixels or the array are coupled to an aggregator or to other detection circuitry via switches. Based on one or more control signals included in the receiving instructions, different switches are activated to couple different pixels to the aggregator or other detection circuitry. This allows the controller to identify different sets of pixels corresponding to different regions of the detector. For example, the control signal identifies rows and columns of the array to activate switches coupled to pixels within the rows and columns. As another example, the control signal identifies coordinates (e.g., pair including a row and a column of the array), and the receiver activates switches coupled to pixels positioned at the identified coordinates. In various embodiments, the controller identifies a region of the detector based on one or more characteristics from the beam steering assembly (e.g., a scanning angle) and provides the receiver with a control signal to activate switches coupled to pixels within the identified region. This selection of a particular set of pixels of the detector limits light from sources other than the light beam emitted by the transmitter incident on the detector and may reduce power consumption of the detector.

The SPAD included in each pixel of an identified set generates current from light incident on the SPAD. A comparator coupled to each SPAD or other detection circuitry coupled to SPADs from various pixels which converts the generated current to a digital signal. For example, a comparator coupled to a SPAD generates a specific value as output if the current generated by the SPAD exceeds a threshold value and generates an alternative value as output if the current generated by the SPAD is less than the threshold. As another example, a comparator coupled to multiple SPADs generates the specific value if a combined current generated by the multiple SPADs exceeds the threshold value and generates the alternative value if the combined current generated by the multiple SPADs is less than the threshold value. In various embodiments, a time to digital converter (TDC) generates a digital timestamp in response to receiving the specific value from a comparator. Using the digital timestamp and a time when the transmitter emitted the outgoing light, the controller determines depth information for one or more objects in the local area that reflected the outgoing light.

BRIEF DESCRIPTION OF THE DRAWINGS

FIG. 7A a pixel including a single photon avalanche diode (SPAD), in accordance with an embodiment.

FIG. 7B is a detector of an imaging device that includes an array of the pixels of FIG. 7A, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Environment

Figure 1:
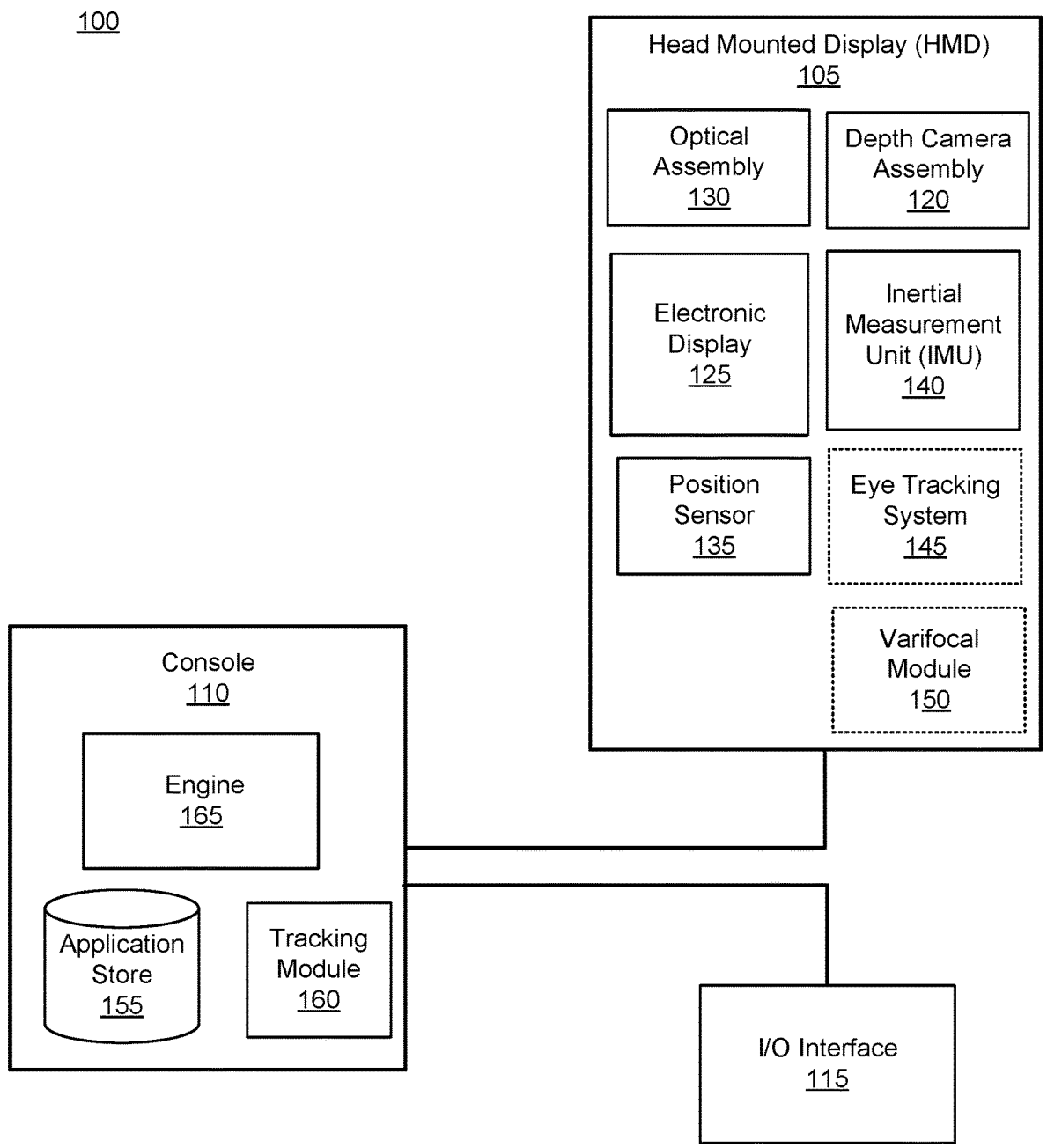
FIG. 1 is a block diagram of a system environment in which a console and a head mounted display (HMD) operate, in accordance with an embodiment.

FIG. 1 is a block diagram of one embodiment of a system environment 100 in which a console 110 and a head mounted display (HMD) 105 operates. The system environment 100 may provide augmented reality (AR) content, virtual reality (VR) content, or mixed reality (MR) content to users in various embodiments. Additionally or alternatively, the system environment 100 generates one or more virtual environments and presents a virtual environment with which a user may interact to the user. The system environment 100 shown by FIG. 1 comprises a HMD 105 and an input/output (I/O) interface 115 that is coupled to the console 110. While FIG. 1 shows an example HMD system 100 including one HMD 105 and on I/O interface 115, in other embodiments any number of these components may be included in the HMD system 100. For example, there may be multiple HMDs 105 each having an associated I/O interface 115, with each HMD 105 and I/O interface 115 communicating with the console 110. In alternative configurations, different and/or additional components may be included in the HMD system 100. Additionally, functionality described in conjunction with one or more of the components shown in FIG. 1 may be distributed among the components in a different manner than described in conjunction with FIG. 1 in some embodiments. For example, some or all of the functionality of the console 110 is provided by the HMD 105.

The HMD 105 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 105, the console 110, or both, and presents audio data based on the audio information. The HMD 105 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 105 is further described below in conjunction with FIGS. 2 and 3.

The HMD 105 includes a DCA 120, an electronic display 125, an optical assembly 130, one or more position sensors 135, an IMU 140, an optional eye tracking system 145, and an optional varifocal module 150. Some embodiments of the HMD 105 have different components than those described in conjunction with FIG. 1. Additionally, the functionality provided by various components described in conjunction with FIG. 1 may be differently distributed among the components of the HMD 105 in other embodiments.

The DCA 120 captures data describing depth information of a local area surrounding some or all of the HMD 105. The DCA 120 can compute the depth information using the data (e.g., based on captured portions of polarized light), or the DCA 120 can send this information to another device such as the console 110 that can determine the depth information using the data from the DCA 120. In various embodiments, the DCA 120 includes a beam steering assembly having a transmitter, a receiver, and a controller. The transmitter of the DCA 120 is configured to illuminate the local area with outgoing light in accordance with emission instructions. For example, the transmitter of the DCA 120 comprises an illumination source, a fine steering element, a coarse steering element, and a projection assembly. The illumination source is configured to emit one or more optical beams. In some embodiments, the illumination source directly generates the one or more optical beams as polarized light, e.g., based on a polarizing element integrated into the illumination source or placed in front of the illumination source. In alternate embodiments, the illumination source generates the one or more optical beams as unpolarized light. The fine steering element is configured to deflect, based in part on the emission instructions, the one or more optical beams at a first deflection angle to generate one or more first order deflected scanning beams. In various embodiments, the fine steering element is implemented using one dimensional or two dimensional optical phased array emitters, in which phase delays may be individually introduced for different emitters, allowing control of beam deflection The one or more first order deflected scanning beams are coupled into the coarse steering element. The coarse steering element is configured to deflect the one or more first order deflected scanning beams at a second deflection angle larger than the first deflection angle to generate outgoing light having a large angular spread. The coarse steering element may be based on, e.g., scanning lenses, a polarization grating stack, liquid crystal gratings, etc. In some embodiments, the coarse steering element deflects the one or more first order deflected scanning beams based in part on the emission instructions. The generated outgoing light having the large angular spread provides a wide field-of-view for scanning of the one or more objects in the local area. In some embodiments, the outgoing light is composed of one or more outgoing light beams. In alternate embodiments, the outgoing light is structured light of a defined pattern, e.g., a dot pattern or a line pattern. In some embodiments, the outgoing light is polarized light, e.g., circularly polarized light of a first handedness. The projection assembly is configured to project the outgoing light into the local area.

The receiver of the DCA 120 is configured to capture one or more images of the local area including reflected light comprising portions of the outgoing light from the projection assembly reflected from the one or more objects in the local area. In some embodiments, the receiver of the DCA 120 includes a polarizing element for receiving the reflected light having a specific polarization and propagating the polarized reflected light. In some embodiments, the polarizing element is common for both the transmitter and the receiver. In some embodiments, the reflected light includes circularly polarized light, e.g., of a second handedness orthogonal to the first handedness of the outgoing light. The receiver includes a detector comprising a two dimensional array of single photon avalanche diode (SPAD) pixels.

The controller of the DCA 120 is coupled to the transmitter and to the receiver and is configured to generate emission instructions for the transmitter. The controller of the DCA 120 provides the emission instructions to one or more components of the transmitter, e.g., the illumination source, the fine steering element, and/or the coarse steering element. Additionally, the controller is coupled to switches or gates coupled to different SPAD pixels of the detector included in the receiver. As further described below, the controller provides control signals to various switches or gates to retrieve current generated from SPAD pixels coupled to the switches or gates based on light detected by the SPAD pixels. Based on the current retrieved from SPAD pixels of the detector, the controller determines depth information for the one or more objects based in part on the captured one or more images.

The electronic display 125 displays 2D or 3D images to the user in accordance with data received from the console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 130 magnifies image light received from the electronic display 125, corrects optical errors associated with the image light, and presents the corrected image light to a user of the HMD 105. The optical assembly 130 includes a plurality of optical elements. Example optical elements included in the optical assembly 130 include: an aperture, a Fresnel lens, a convex lens, a concave lens, a filter, a reflecting surface, or any other suitable optical element that affects image light. Moreover, the optical assembly 130 may include combinations of different optical elements. In some embodiments, one or more of the optical elements in the optical assembly 130 may have one or more coatings, such as partially reflective or anti-reflective coatings.

Magnification and focusing of the image light by the optical assembly 130 allows the electronic display 125 to be physically smaller, weigh less and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 130 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 125 for display is pre-distorted, and the optical assembly 130 corrects the distortion when it receives image light from the electronic display 125 generated based on the content.

The IMU 140 is an electronic device that generates data indicating a position of the HMD 105 based on measurement signals received from one or more of the position sensors 135 and from depth information received from the DCA 120. A position sensor 135 generates one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the HMD 105 relative to an initial position of the HMD 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the HMD 105 from the sampled data. For example, the IMU 140 integrates the measurement signals received from the accelerometers over time to estimate a velocity vector and integrates the velocity vector over time to determine an estimated current position of a reference point on the HMD 105. Alternatively, the IMU 140 provides the sampled measurement signals to the console 110, which interprets the data to reduce error. The reference point is a point that may be used to describe the position of the HMD 105. The reference point may generally be defined as a point in space or a position related to the HMD's 105 orientation and position.

The IMU 140 receives one or more parameters from the console 110. The one or more parameters are used to maintain tracking of the HMD 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the HMD 105, the IMU 140 may be a dedicated hardware component. In other embodiments, the IMU 140 may be a software component implemented in one or more processors.

In some embodiments, the eye tracking system 145 is integrated into the HMD 105. The eye tracking system 145 determines eye tracking information associated with an eye of a user wearing the HMD 105. The eye tracking information determined by the eye tracking system 145 may comprise information about an orientation of the user's eye, i.e., information about an angle of an eye-gaze. In some embodiments, the eye tracking system 145 is integrated into the optical assembly 130. An embodiment of the eye-tracking system 145 may comprise an illumination source and an imaging device, such as a camera.

In some embodiments, the varifocal module 150 is further integrated into the HMD 105. The varifocal module 150 may be coupled to the eye tracking system 145 to obtain eye tracking information determined by the eye tracking system 145. The varifocal module 150 may be configured to adjust focus of one or more images displayed on the electronic display 125, based on the determined eye tracking information obtained from the eye tracking system 145. In this way, the varifocal module 150 can mitigate vergence-accommodation conflict in relation to image light. The varifocal module 150 can be interfaced (e.g., either mechanically or electrically) with at least one of the electronic display 125 and at least one optical element of the optical assembly 130. Then, the varifocal module 150 may be configured to adjust focus of the one or more images displayed on the electronic display 125 by adjusting position of at least one of the electronic display 125 and the at least one optical element of the optical assembly 130, based on the determined eye tracking information obtained from the eye tracking system 145. By adjusting the position, the varifocal module 150 varies focus of image light output from the electronic display 125 towards the user's eye. The varifocal module 150 may be also configured to adjust resolution of the images displayed on the electronic display 125 by performing foveated rendering of the displayed images, based at least in part on the determined eye tracking information obtained from the eye tracking system 145. In this case, the varifocal module 150 provides appropriate image signals to the electronic display 125. The varifocal module 150 provides image signals with a maximum pixel density for the electronic display 125 only in a foveal region of the user's eye-gaze, while providing image signals with lower pixel densities in other regions of the electronic display 125.

In some embodiments, the varifocal module 150 is coupled to the DCA 120 and may use the depth information obtained by the DCA 120 to generate content for presentation on the electronic display 125. In other embodiments, the varifocal module 150 may control scanning and depth determination operations of the DCA 120. For example, the varifocal module 150 identifies a portion of a local area surrounding the DCA 120 is being scanned and for which depth information is determined based in part on information about vergence and/or accommodation of the user's eye to mitigate vergence-accommodation conflict.

The I/O interface 115 is a device that allows a user to send action requests and receive responses from the console 110. An action request is a request to perform a particular action. For example, an action request may be an instruction to start or end capture of image or video data or an instruction to perform a particular action within an application. The I/O interface 115 may include one or more input devices. Example input devices include: a keyboard, a mouse, a game controller, or any other suitable device for receiving action requests and communicating the action requests to the console 110. An action request received by the I/O interface 115 is communicated to the console 110, which performs an action corresponding to the action request. In some embodiments, the I/O interface 115 includes an IMU 140 that captures calibration data indicating an estimated position of the I/O interface 115 relative to an initial position of the I/O interface 115. In some embodiments, the I/O interface 115 may provide haptic feedback to the user in accordance with instructions received from the console 110. For example, haptic feedback is provided when an action request is received, or the console 110 communicates instructions to the I/O interface 115 causing the I/O interface 115 to generate haptic feedback when the console 110 performs an action.

The console 110 provides content to the HMD 105 for processing in accordance with information received from one or more of: the DCA 120, the HMD 105, and the I/O interface 115. In the example shown in FIG. 1, the console 110 includes an application store 155, a tracking module 160, and an engine 165. Some embodiments of the console 110 have different modules or components than those described in conjunction with FIG. 1. Similarly, the functions further described below may be distributed among components of the console 110 in a different manner than described in conjunction with FIG. 1.

The application store 155 stores one or more applications for execution by the console 110. An application is a group of instructions, that when executed by a processor, generates content for presentation to the user. Content generated by an application may be in response to inputs received from the user via movement of the HMD 105 or the I/O interface 115. Examples of applications include: gaming applications, conferencing applications, video playback applications, or other suitable applications.

The tracking module 160 calibrates the system environment 100 using one or more calibration parameters and may adjust one or more calibration parameters to reduce error in determination of the position of the HMD 105 or of the I/O interface 115. For example, the tracking module 160 communicates a calibration parameter to the DCA 120 to adjust the focus of the DCA 120 to more accurately determine positions of structured light elements captured by the DCA 120. Calibration performed by the tracking module 160 also accounts for information received from the IMU 140 in the HMD 105 and/or an IMU 140 included in the I/O interface 115. Additionally, if tracking of the HMD 105 is lost (e.g., the DCA 120 loses line of sight of at least a threshold number of structured light elements), the tracking module 160 may re-calibrate some or all of the system environment 100.

The tracking module 160 tracks movements of the HMD 105 or of the I/O interface 115 using information from the DCA 120, the one or more position sensors 135, the IMU 140 or some combination thereof. For example, the tracking module 150 determines a position of a reference point of the HMD 105 in a mapping of a local area based on information from the HMD 105. The tracking module 160 may also determine positions of the reference point of the HMD 105 or a reference point of the I/O interface 115 using data indicating a position of the HMD 105 from the IMU 140 or using data indicating a position of the I/O interface 115 from an IMU 140 included in the I/O interface 115, respectively. Additionally, in some embodiments, the tracking module 160 may use portions of data indicating a position or the HMD 105 from the IMU 140 as well as representations of the local area from the DCA 120 to predict a future location of the HMD 105. The tracking module 160 provides the estimated or predicted future position of the HMD 105 or the I/O interface 115 to the engine 155.

The engine 165 generates a 3D mapping of the area surrounding some or all of the HMD 105 (i.e., the "local area") based on information received from the HMD 105. In some embodiments, the engine 165 determines depth information for the 3D mapping of the local area based on information received from the DCA 120 that is relevant to one or more methods for computing depth. The engine 165 may calculate depth information using one or more methods for computing depth from the portion of the reflected polarized light detected by the DCA 120, such as a structured light illumination technique or a time-of-flight technique. In various embodiments, the engine 165 uses the depth information to update a model of the local area, and generate content based in part on the updated model.

The engine 165 also executes applications within the HMD system 100 and receives position information, acceleration information, velocity information, predicted future positions, or some combination thereof, of the HMD 105 from the tracking module 160. Based on the received information, the engine 165 determines content to provide to the HMD 105 for presentation to the user. For example, if the received information indicates that the user has looked to the left, the engine 165 generates content for the HMD 105 that mirrors the user's movement in a virtual environment or in an environment augmenting the local area with additional content. Additionally, the engine 165 performs an action within an application executing on the console 110 in response to an action request received from the I/O interface 115 and provides feedback to the user that the action was performed. The provided feedback may be visual or audible feedback via the HMD 105 or haptic feedback via the I/O interface 115. In some embodiments, based on the eye tracking information (e.g., orientation of the user's eye) received from the eye tracking system 145, the engine 165 determines resolution of the content provided to the HMD 105 for presentation to the user on the electronic display 125. For example, the engine 165 provides the content to the HMD 105 having a maximum pixel resolution on the electronic display 125 in a foveal region of the user's gaze, while the engine 165 provides a lower pixel resolution in other regions of the electronic display 125, which reduces power consumption by the HMD 105 and saves computing cycles of the console 110 without compromising visual experience of the user. In some embodiments, the engine 165 further uses the eye tracking information to adjust where objects are displayed on the electronic display 125 to prevent vergence-accommodation conflict.

Figure 2:
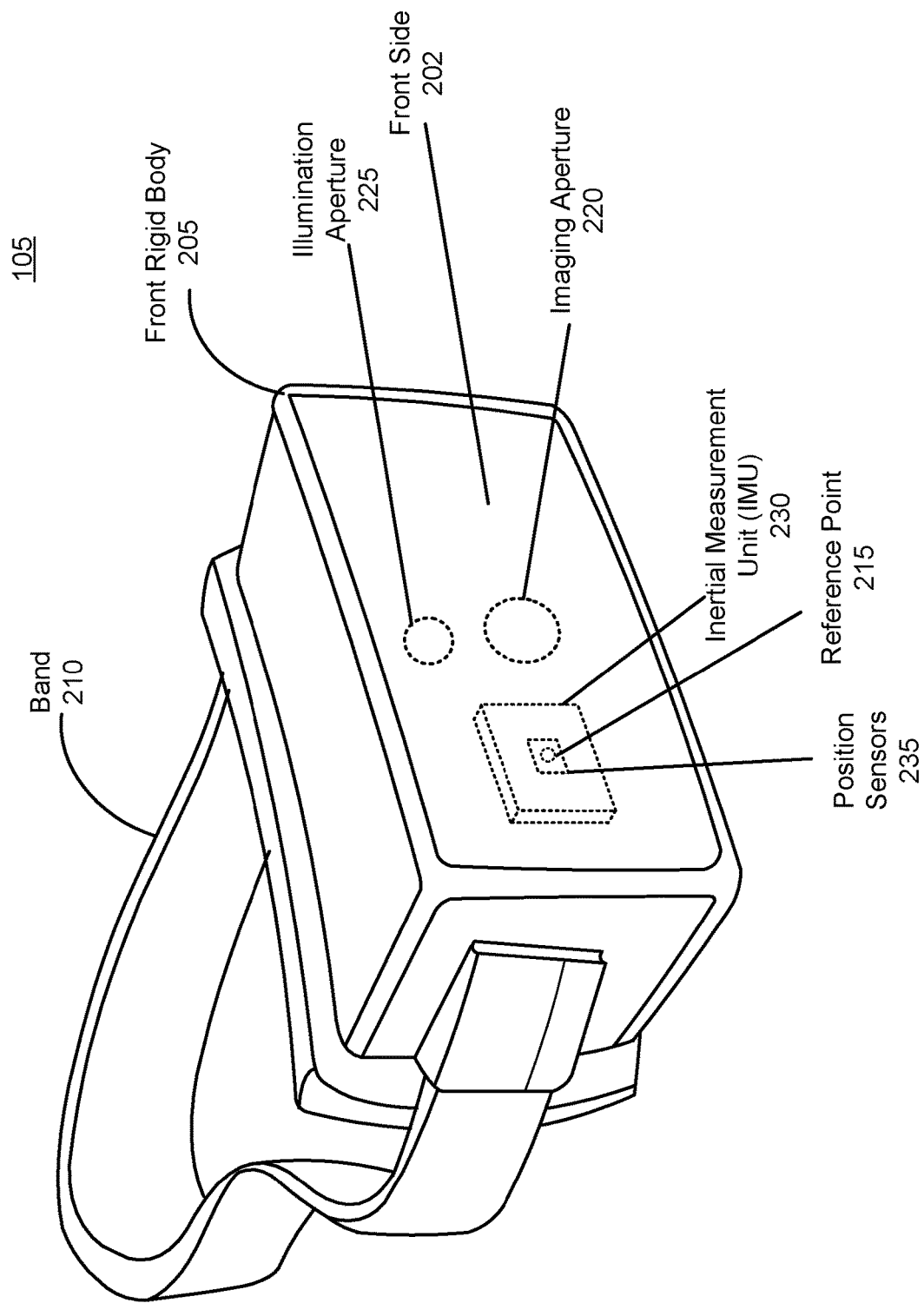
FIG. 2 is a diagram of a head-mounted display (HMD), in accordance with an embodiment.

FIG. 2 is a diagram of one embodiment of a head mounted display (HMD) 105. As described above in conjunction with FIG. 1, the HMD 105 may be part of a VR system, an AR system, a MR system, or some combination thereof. In embodiments where the HMD 105 is included in an AR system or in a MR system, portions of a front side 102 of the HMD 105 are at least partially transparent in a visible band of wavelengths (~380 nm to 750 nm), and portions of the HMD 105 between the front side 102 of the HMD 105 and an eye of the user are at least partially transparent (e.g., a partially transparent electronic display). The HMD 105 includes a front rigid body 205, a band 210, and a reference point 215.

Additionally, the HMD 105 includes a DCA, further described below in conjunction with FIGS. 3-7B, configured to determine depth information of a local area surrounding some or all of the HMD 105. The HMD 105 also includes an imaging aperture 220 and an illumination aperture 225. An illumination source of the DCA A emits light through the illumination aperture 225, while an imaging device of the DCA captures light from the illumination source that is reflected from the local area through the imaging aperture 220. Light from the local area received through the imaging aperture 220 and captured by the imaging device of the DCA includes portions of the light reflected from one or more objects in the local area. The imaging device of the DCA detects the portions of the light reflected from the one or more objects in the local area, as discussed in more detail in conjunction with FIGS. 3-7B.

The front rigid body 205 includes one or more electronic display elements (not shown in FIG. 2), one or more integrated eye tracking systems (not shown in FIG. 2), an Inertial Measurement Unit (IMU) 230, one or more position sensors 235, and the reference point 215. In the embodiment shown by FIG. 2, the position sensors 235 are located within the IMU 330, and neither the IMU 230 nor the position sensors 235 are visible to a user of the HMD 105. The IMU 230 is an electronic device that generates fast calibration data based on measurement signals received from one or more of the position sensors 235. A position sensor 235 generates one or more measurement signals in response to motion of the HMD 105. Examples of position sensors 235 include: one or more accelerometers, one or more gyroscopes, one or more magnetometers, another suitable type of sensor that detects motion, a type of sensor used for error correction of the IMU 230, or some combination thereof. The position sensors 235 may be located external to the IMU 230, internal to the IMU 230, or some combination thereof.

Figure 3:
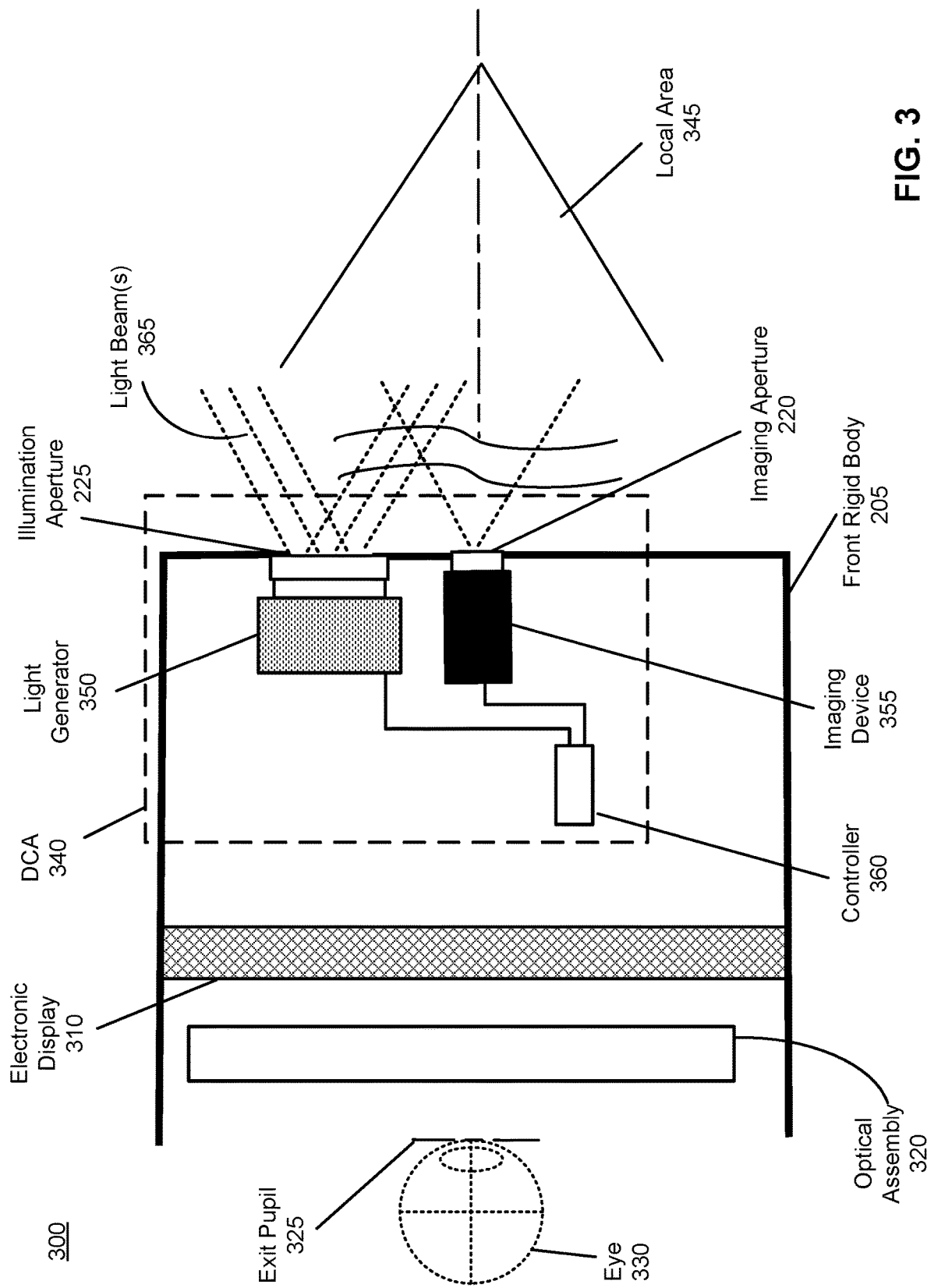
FIG. 3 is a cross section of a front rigid body of the head mounted display (HMD) in FIG. 2, in accordance with an embodiment.

FIG. 3 is a cross section 300 of the front rigid body 205 of the HMD 105 shown in FIG. 2. As shown in FIG. 3, the front rigid body 205 includes an electronic display 310 and an optical assembly 320 that together provide image light to an exit pupil 325. The exit pupil 325 is a region in space that would be occupied by a user's eye 330. In some cases, the exit pupil 325 may also be referred to as an eye-box. For purposes of illustration, FIG. 3 shows a cross section 300 associated with a single eye 330, but another optical assembly 320, separate from the optical assembly 320, similarly provides altered image light to another eye of the user. The front rigid body 205 also has an optical axis corresponding to a path along which image light propagates through the front rigid body 205.

The electronic display 310 generates image light. In some embodiments, the electronic display 310 includes an optical element that adjusts the focus of the generated image light. The electronic display 310 displays images to the user in accordance with data received from a console (not shown in FIG. 3). In various embodiments, the electronic display 310 may comprise a single electronic display or multiple electronic displays (e.g., a display for each eye of a user). Examples of the electronic display 310 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 310 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 320 magnifies received light from the electronic display 310, corrects optical aberrations associated with the image light, and the corrected image light is presented to a user of the HMD 105. At least one optical element of the optical assembly 320 may be an aperture, a Fresnel lens, a refractive lens, a reflective surface, a diffractive element, a waveguide, a filter, or any other suitable optical element that affects the image light emitted from the electronic display 310. Moreover, the optical assembly 320 may include combinations of different optical elements. In some embodiments, one or more of the optical elements in the optical assembly 320 may have one or more coatings, such as anti-reflective coatings, dichroic coatings, etc. Magnification of the image light by the optical assembly 320 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 320 is designed so its effective focal length is larger than the spacing to the electronic display 310, which magnifies the image light projected by the electronic display 310. Additionally, in some embodiments, the amount of magnification may be adjusted by adding or removing optical elements.

As shown in FIG. 3, the front rigid body 205 further includes a DCA 340 for determining depth information of one or more objects in a local area 345 surrounding some or all of the HMD 105. The DCA 340 includes a light generator 350, an imaging device 355, and a controller 360 that may be coupled to both the light generator 350 and to the imaging device 355. The light generator 350 emits one or more light beams 365 through the illumination aperture 225. The light generator 350 illuminates the local area 345 with the one or more light beams 365 in accordance with emission instructions generated by the controller 360. The light generator 350 can be part of a transmitter of a beam steering assembly incorporated into the DCA 340, as further described in conjunction with FIG. 4.

The light generator 350 may include a plurality of emitters that each emits light having certain characteristics (e.g., wavelength, polarization, coherence, pulse width, temporal behavior, etc.). Various emitters may have common characteristics or different characteristics, and the emitters can be operated simultaneously or individually. Example emitters include laser diodes (e.g., edge emitters), inorganic or organic light emitting diodes (LEDs), a vertical-cavity surface-emitting laser (VCSEL), or some other source. In some embodiments, a single emitter or a plurality of emitters in the light generator 350 can emit the one or more light beams 365 that form a structured light pattern, e.g., a dot pattern. In some embodiments, the light generator 350 includes a laser diode (e.g., infrared laser diode) and a polarizing element for generating the one or more light beams 365 as polarized light.

The imaging device 355 is configured to capture, through the imaging aperture 220, portions of the one or more light beams 365 reflected from the local area 345. The imaging device 355 includes a detector (not shown in FIG. 3) implemented as a dense array of single photon avalanche diode (SPAD) pixels. The imaging device 355 may also include a polarization sensitive photodetector that uses, e.g., optically anisotropic materials to detect photons of a specific polarization, e.g., linear, circular, elliptical, etc. The imaging device 355 captures one or more images of one or more objects in the local area 345 illuminated with the one or more light beams 365. In various embodiments, the imaging device 355 has a focus that spreads captured light across a subset of the multiple SPAD pixels; hence, a point spread function of the imaging device 355 spreads light captured by the imaging device 355 across multiple SPAD pixels, creating a region of interest comprising the SPAD pixels onto which the imaging device 355 directs captured light; hence, the region of interest comprises a subset of the SPAD pixels included in the detector. In the preceding example, a size of the region of interest of SPAD pixels is determined based on an expected maximum or minimum range of the DCA 340 so the region of interest of SPAD pixels is sufficient for analog signal processing or digital histogram processing.

The controller 360 may control operation of certain components of the light generator 350, based on the emission instructions. In some embodiments, the controller 360 may provide the emission instructions to a fine steering element (not shown in FIG. 3) and/or a coarse steering element (not shown in FIG. 3), within the light generator 350 to control a field-of-view of the local area 345 illuminated by the one or more light beams 365. As further described below in conjunction with FIGS. 5-7, the controller 360 is coupled to the imaging device 355 and provides control signals to a detector of the imaging device 355 identifying one or more single photon avalanche diode (SPAD) pixels of the detector from which current is obtained. This allows the controller 360 to identify specific sets of SPAD pixels of the detector from which timestamps corresponding to current produced by captured light is retrieved, reducing ambient current generated by SPAD pixels outside of an identified set of SPAD pixels of the detector.

The controller 360 is configured to determine depth information for the one or more objects in the local area 345 based at least in part on the captured portions of the one or more reflected light beams. In some embodiments, for depth sensing based on time-of-flight, the controller 360 determines the depth information based on charges stored in storage bins associated with one or more SPAD pixels in the detector of the imaging device 355 over a defined amount of time. In some embodiments, the controller 360 provides the determined depth information to a console (not shown in FIG. 3) and/or an appropriate module of the HMD 105 (e.g., a varifocal module, not shown in FIG. 3). The console and/or the HMD 105 may use the depth information to generate content for presentation on the electronic display 310 in various embodiments.

In some embodiments, the front rigid body 205 further comprises an eye tracking system (not shown in FIG. 2 or 3) that determines eye tracking information for the user's eye 330. The determined eye tracking information may comprise information about an orientation of the user's eye 330 in an eye-box, i.e., information about an angle of an eye-gaze. An eye-box represents a three-dimensional volume at an output of the HMD 105 in which the user's eye is located to receive image light. In one embodiment, the user's eye 330 is illuminated with a structured light pattern and the eye tracking system uses locations of the reflected structured light pattern in a captured image to determine a position and a gaze of the user's eye 330. In another embodiment, the eye tracking system determines a position and a gaze of the user's eye 330 based on magnitudes of image light captured over a plurality of time instants.

In some embodiments, the front rigid body 205 further comprises a varifocal module (not shown in FIG. 2 or 3). The varifocal module may adjust focus of one or more images displayed on the electronic display 310, based on eye tracking information. In one embodiment, the varifocal module adjusts focus of the displayed images and mitigates vergence-accommodation conflict by adjusting a focal distance of the optical assembly 320 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 360 to generate content for presentation on the electronic display 310.

Figure 4:
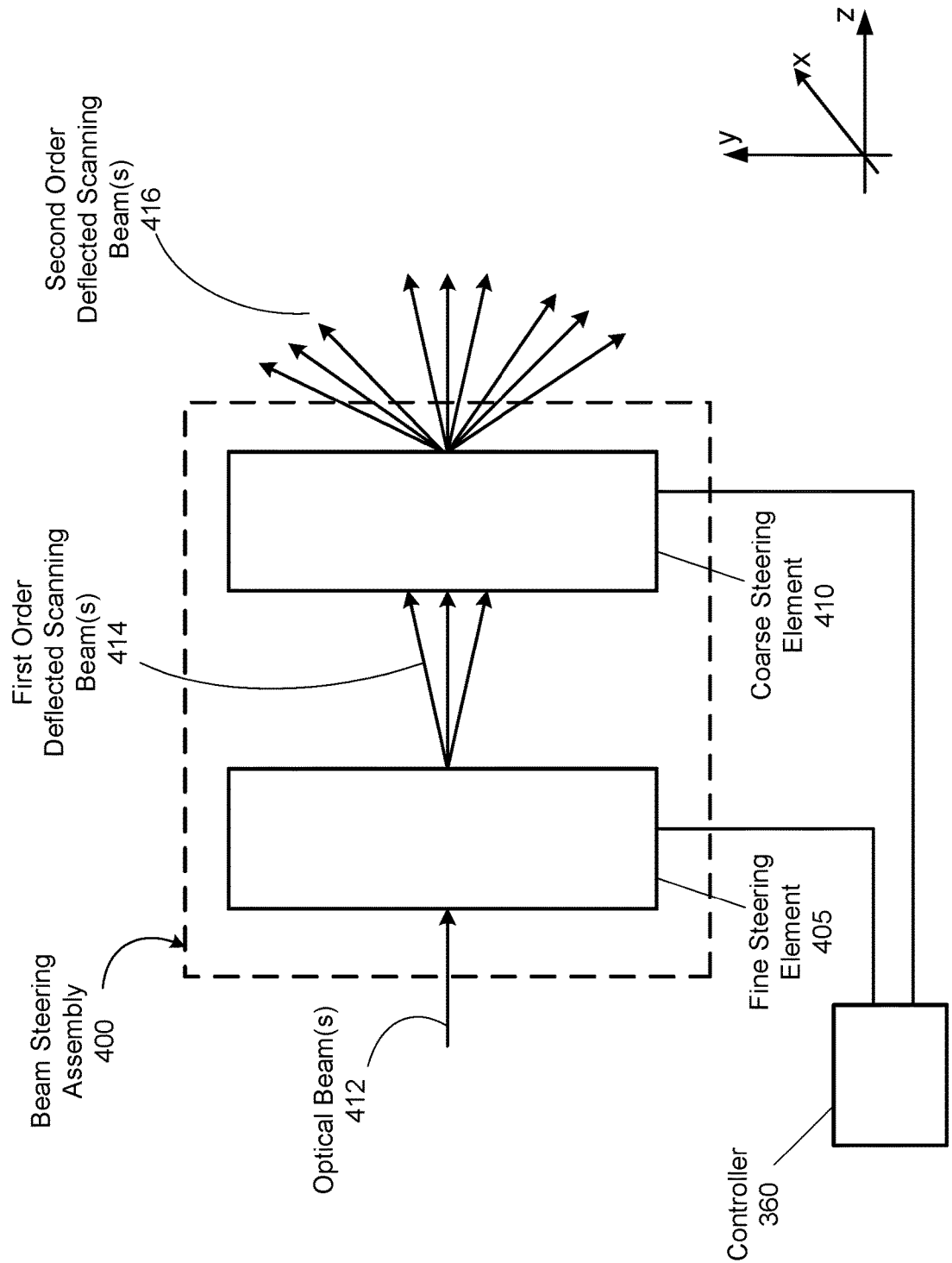
FIG. 4 is a beam steering assembly including a fine steering element and a coarse steering element, which may be integrated into a depth camera assembly (DCA), in accordance with an embodiment.

FIG. 4 illustrates an example beam steering assembly 400, which may be part of the DCA 340 in FIG. 3, in accordance with an embodiment. The beam steering assembly 400 cascades a fine steering element 405 with a coarse steering element 410. The fine steering element 405 deflects one or more optical beams 412 emitted from an illumination source (not shown in FIG. 4) to generate one or more first order deflected scanning beams 414. The fine steering element 405 may be configured to rapidly change a scanning angle of the one or more first order deflected scanning beams 414 over a limited range (e.g., between −10 degrees and +10 degrees), based in part on emission instructions from a controller 360. The fine steering element 405 is thus configured to operate at a high rate and can dwell or step adaptively, e.g., based in part on the emission instructions from the controller 3260. It should be understood that deflection in relation to the fine steering element 405 is a general term that can also refer to other physical effects, such as refraction, reflection or diffraction, depending on an exact physical element used as the fine steering element 405.

In some embodiments, the fine steering element 405 can be implemented based upon one or more acousto-optic devices. In one embodiment, the fine steering element 405 is implemented as an acousto-optic deflector operating in the Bragg regime. In another embodiment, the fine steering element 405 is implemented as a surface acoustic wave (SAW) deflector. In yet another embodiment, the fine steering element 405 is implemented as a thin grating operating in the Raman-Nath regime. As another example, the fine steering element 405 is implemented using one dimensional or two dimensional optical phased array emitters, in which phase delays may be individually introduced for different emitters, allowing control of beam deflection. In general, the fine steering element 405 is configured to function as a dynamic diffraction grating that diffracts the one or more optical beams 412 to form the one or more first order deflected scanning beams 414 based in part on the emission instructions from the controller 360.

The coarse steering element 410 deflects the one or more first order deflected scanning beams 414 to generate one or more second order deflected scanning beams 416 to allow scanning over a large angular range, e.g., between −60 degrees and +60 degrees along both x and y dimensions (horizontal and vertical dimensions). It should be understood that deflection in relation to the coarse steering element 410 is a general term that can also refer to other physical effects, such as refraction, reflection or diffraction, depending on an exact physical element used as the coarse steering element 410. The one or more second order deflected scanning beams 416 represent an embodiment of the one or more light beams 465 emitted by the DCA 340 in FIG. 3. In some embodiments, the one or more second order deflected scanning beams 416 represent structured light having a dot pattern, a line pattern, or any other suitable pattern. By combining the fine steering element 405 providing a small angular spread with the coarse steering element 410 providing a larger angle deviation, the beam steering assembly 400 is flexible in that the one or more generated second order deflected scanning beams 416 can be projected in different areas of a volume. It should be understood that implementation requirements on the combination of fine steering element 405 and coarse steering element 410 may depend on specifications of performance and constraints related to the beam steering assembly 400. One particular implementation method can be chosen over another for different reasons, including ability to reach a particular angular range amplification from the fine steering element 405 to the coarse steering element 410 (e.g., amplification of six times), a switching speed, a power consumption, a size/weight of components of the beam steering assembly 400, etc.

In some embodiments, the coarse steering element 410 covers a wide range of rates. For example, a scanning speed of the coarse steering element 410 varies from matching that of the fine steering element 405 implemented based upon one or more acousto-optic devices (e.g., MHz scanning speed) to sub-kHz scanning speed. In one embodiment, the coarse steering element 410 is implemented based on scanning lenses. In another embodiment, the coarse steering element 410 is implemented as a liquid lens deflector. In yet another embodiment, the coarse steering element 410 is implemented based on polarization grating stacks. Examples of the beam steering assembly are further described in U.S. patent application Ser. No. 15/696,907, filed on Sep. 6, 2017, which is hereby incorporated by reference in its entirety.

Figure 5:
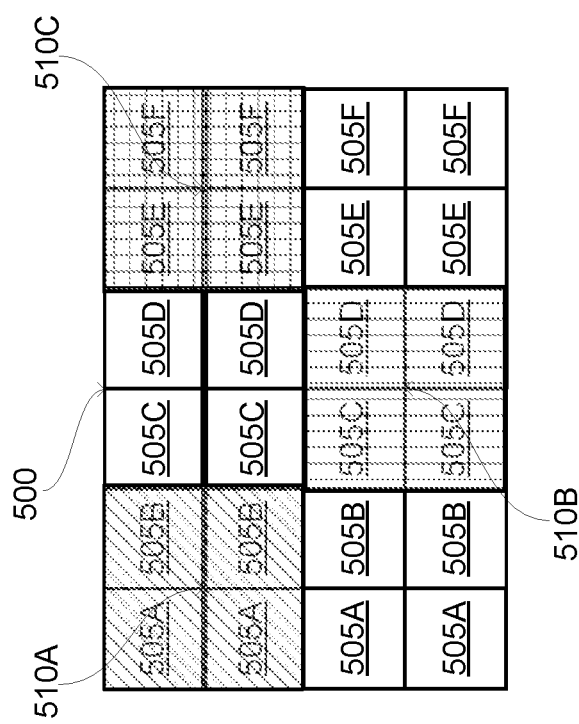
FIG. 5 is an example of a detector of an imaging device of a depth camera assembly (DCA), in accordance with an embodiment.

FIG. 5 illustrates one embodiment of a detector 500 of an imaging device 355 of a depth camera assembly (DCA) 340. In the example shown by FIG. 5, the detector 500 comprises a two-dimensional array of SPAD pixels 505A-F. The array of single photon avalanche diode (SPAD} pixels 505A-F includes different sets 510A, 510B, 510C of SPAD pixels 505A-F corresponding to different regions of the detector 500. As further described below in conjunction with FIGS. 6 and 7, different sets 510A, 510B, 510C may be selected based on one or more signals from the controller 360, and current generated by SPAD pixels 505A-F within a selected set 510A, 510B, 510C used to determine depth information for objects without accounting for current generated by SPAD pixels 505A-F that are not within the selected set 510A, 510B, 510C. This allows the controller 360 of the DCA 340 to identify a specific region of the detector 500, so current generated by a set 510A, 510B, 510C corresponding to the specific region from light incident on various SPAD pixels 505A-F of the set 510A, 510B, 510C corresponding to the specific region is summed to generate an analog signal.

As further described below in conjunction with FIGS. 6-7B, the analog signal from the SPAD pixels 505A-F of the specific set 510A-C corresponding to the specific region is provided to edge detection circuitry (e.g., a level threshold comparator or a constant fraction discriminator), which converts the analog signal to a digital timestamp signal and is coupled to the controller 360. If a signal to noise ratio (SNR) of the digital timestamp signal equals or exceeds a threshold value, the controller 360 uses the digital timestamp signal to determine the depth information for an object in a local area surrounding a HMD 105 including the detector 500 from which light emitted by a depth camera assembly 340 of the HMD 105 was reflected and captured by the detector 500. If the SNR of the digital timestamp generated form the analog signal from the SPAD pixels 505A-F of the specific set 510A-C is less than the threshold value, current generated by the SPAD pixels 505A-F of the specific set 510A-C by light incident on the detector 500, including light emitted by the depth camera assembly 340 reflected by the object in the local area surrounding the HMD 105, are is determined and converted into a digital timestamp signal over multiple (e.g., tens, hundreds or thousands) of time intervals. The digital timestamp signals determined over the multiple time intervals are combined and the controller 360 determines whether the SNR equals or exceeds the threshold value. If the SNR of the combined digital timestamp signal exceeds the threshold value, the controller 360 determines the depth information for an object in a local area surrounding a HMD 105 including the detector 500 from which light emitted by a depth camera assembly 340 of the HMD 105 was reflected and captured by the detector 500 from the combined digital timestamp signal. However, if the SNR of the combined digital timestamp signal is less than the threshold value, current generated by the SPAD pixels 505A-F of the specific set 510A-C from captured light is again combined over multiple time intervals and a combined digital timestamp signal determined, as described above, until the SNR of the combined digital timestamp signal exceeds the threshold value, indicating that the aggregated digital timestamp signal is differentiated from background noise.

While FIG. 5 shows an example where the detector 500 includes three sets 510A-C of SPAD pixels 505A-F each corresponding to a different region of the detector 500, in other embodiments, the detector 500 includes any suitable number of sets 510A-C of SPAD pixels 505A-F. Each set 510A-C may include any suitable number of SPAD pixels 505A-F. In some embodiments, each set 510A-C includes a common number of SPAD pixels 505A-F. Alternatively, different sets 501A-C include different numbers of SPAD pixels 505A-F. The controller 360 identifies one or more sets 510A-C based on any suitable criteria in various embodiments. For example, the detector 500 is positioned within a threshold distance of the light generator 350 and a calibration process is performed for the detector 500 and a beam steering assembly of the depth camera assembly 340, during operation of the depth camera assembly 340, the controller 360 predicts a region of the detector 500 onto which of light reflected from a light beam emitted by the light generator 350 is incident from one or more calibration parameters (e.g., a scanning angle) and transmits a control signal to the detector 500 selecting a set 510A, 510B, 510C of SPAD pixels 505A-F corresponding to the predicted region. This selection of a particular set 501A, 510B, 510C of SPAD pixels 505A-F limits light from sources other than the light beam emitted by the light generator 350A incident on the detector 500 and may reduce power consumption of the detector 500.

Figure 6:
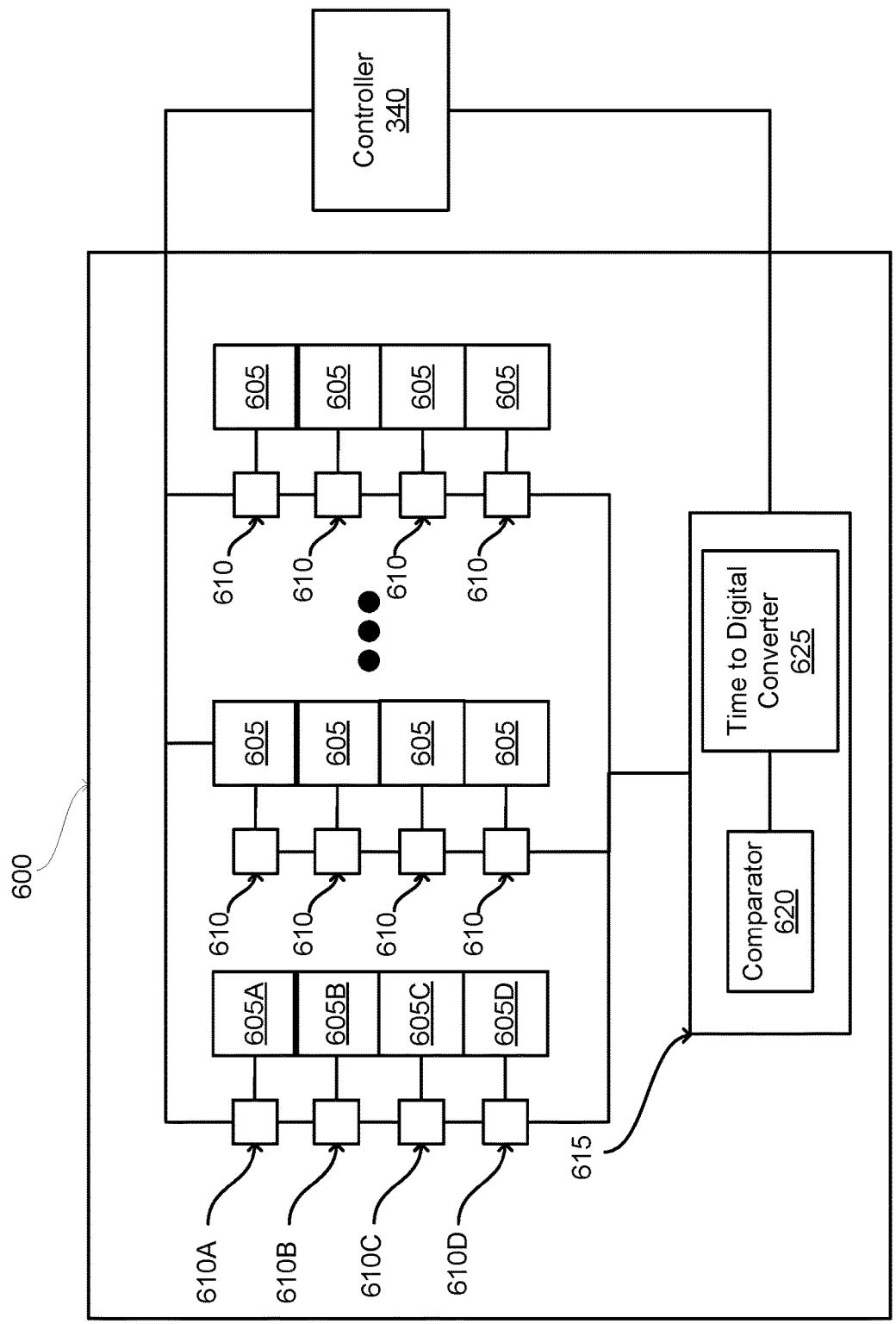
FIG. 6 a detector of an imaging device of a depth camera assembly (DCA) in which individual single photon avalanche diode (SPAD) pixels may be activated, in accordance with an embodiment.

FIG. 6 illustrates one embodiment of a detector 600 of an imaging device 355 of a depth camera assembly (DCA) 340 in which individual single photon avalanche diode (SPAD) pixels 605 may be activated. As shown in FIG. 6, the detector 600 comprises a two dimensional array of SPAD pixels 605. In the embodiment shown by FIG. 6, each SPAD pixel 605 is coupled to a switch 610. The switches 610 are coupled to the controller 360, which provides control signals that activate or deactivate different switches 610. In various embodiments, the controller 360 includes coordinates within the array of SPAD pixels 605 in a control signal to the detector 600, causing switches 610 coupled to SPAD pixels 605 within the included coordinates to be activated, while switches 610 coupled to SPAD pixels 605 outside of the included coordinates are not activated. For example, the receiver 600 receives a control signal from the controller 360 including coordinates specifying a region of the array of SPAD pixels 605 including SPAD pixels 605A, 605B and not including SPAD pixels 605C, 605D; accordingly, switches 610A, 610B that are coupled to SPAD pixels 605A, 605B, respectively, are activated, while switches 610C, 610D that are coupled to SPAD pixels 605C, 605D, respectively, are not activated. In various embodiments, any suitable type of switch 610 may be coupled to each SPAD pixel 605 of the array.

When activated, a switch 610 coupled to a SPAD pixel 605 couples the SPAD pixel 605 to an aggregator 615. In the example shown by FIG. 6, the aggregator 615 includes a comparator 620 coupled to a time to digital converter (TDC) 625. Current generated by each SPAD pixel 605 coupled to an activated switch 610 is aggregated at the comparator 620, which outputs a particular value if the aggregated current exceeds a threshold value and outputs an alternative value if the aggregated current does not exceed the threshold value. The threshold value of the comparator 620 may be specified during a calibration process in various embodiments. The comparator 620 is coupled to the TDC 625, which generates a digital representation of a time when the TDC 625 receives the particular value from the comparator 620. Accordingly, the TDC 625 generates a digital representation of a time when the comparator 620 indicates the aggregated current from SPAD pixels 605 coupled to activated switches 610 exceeds the threshold value. The TDC 625 is also coupled to the controller 360, which receives the digital representation of the time when the comparator 620 indicated the aggregated current from the SPAD pixels 605 coupled to the comparator 620 via activated switches 610. Based on the digital representation of the time received from the comparator 620 and a time when the light generator 350 of the DCA 340 emitted one or more light beams, the controller 360 determines depth information for objects in the local area of the HMD 105 including the DCA 340. As the comparator 620 provides the particular value to the TDC 620 when the aggregated current from SPAD pixels 605 exceeds the threshold value, the digital representation of the time generated by the TDC 625 corresponds to a time when the aggregated current exceeded the threshold value is distinguishable from current generated by the SPAD pixels 605 from ambient light, indicating that the SPAD pixels 605 generated current from reflection by one or more objects in the local area surrounding the HMD 105 of a light beam emitted by the light generator 350 of the DCA 340.

While FIG. 6 shows an embodiment where the aggregator 615 includes a comparator 620 coupled to the TDC 625, in other embodiments, the aggregator 615 includes a discriminator. In such an embodiment, the discriminator provides a signal to the TDC 625 in response to aggregated current from SPAD pixels 605 coupled to the discriminator via activated switches exceeds the threshold value. As described above, the TDC 625 generates a digital representation of the time when the TDC 625 received the signal from the discriminator and provide the digital representation of the time to the controller 360.

FIG. 7A shows an embodiment of a pixel 700 including a single photon avalanche diode (SPAD) 705. The pixel 700 shown by FIG. 7A includes a comparator 710 coupled to the SPAD 705. Light incident on the SPAD 705 generates a current, which is received by the comparator 710. In response to the current received from the SPAD 705 exceeding a threshold value, the comparator 710 generates a particular value that is output from the comparator 710. However, in response to the current received form the SPAD 705 being less than the threshold value, the comparator 710 generates an alternative value that is output. Hence, the comparator 710 converts current generated by the SPAD 705 to a normalized digital signal that is output from the comparator 710, allowing the pixel 700 to provide a digital output. While FIG. 7A shows a comparator 710 coupled to the SPAD 705 of the pixel 700, in other embodiments the pixel 700 includes a discriminator coupled to the SPAD 705 that generates the specific value when the current generated by the SPAD 705 exceeds the threshold value and generates the alternative value when the current generated by the SPAD 705 is less than the threshold value.

FIG. 7B shows an example detector 720 including an array of pixels 700 that each include a SPAD 705 and a comparator 710, as shown in FIG. 7A. The output of each pixel 700 (i.e., the output of a comparator 710 included in each pixel 700) is coupled to one of a plurality of output channels 725A, 725B, 725C, 725D. In the example shown by FIG. 7B, each output channel 725A, 725B, 725C, 725D may make multiple (e.tg. two or more) connections with pixels 700 included in a particular column of the array of pixels 700. For example, output channel 725A is coupled to pixel 700A and to pixel 70E in a specific column of the array, while output channel 725B is coupled to pixel 700B and to pixel 700F in the specific column of the array. Output channel 725C is coupled to pixel 700C in the specific column of the array, and output channel 725D is coupled to pixel 700D in the specific column of the array in the example shown by FIG. 7B. Similarly, pixel 700G and pixel 700K in an additional column of the array are coupled to a first output channel, while pixel 700H and pixel 700L in the additional column of the array are coupled to a second output channel. Pixel 700I in the additional column is coupled to a third output channel, and pixel 700J is coupled to a fourth output channel. The number of output channels coupled to a column of pixels 700 in the array specifies a maximum number of rows included in a set of pixels 700, as described above in conjunction with FIG. 5. Hence, in the example of FIG. 7, sets of pixels 700 that each comprise up to four rows of pixels 700 may be identified.

Accordingly, the controller 360 provides one or more control signals specifying a set of pixels 700 to the detector, which activate switches coupling the pixels 700 in the specified set to their respective output channels 725A, 725B, 725C, 725D and deactivate switches coupling pixels not in the specified set to their respective output channels 725A, 725B, 725C, 725D. For example, the controller 360 provides a control signal to the detector 720 identifying rows of the array of pixels 700 including pixels 700A, 700B, 700C, and 700D; therefore, a switch coupling pixel 700A to output channel 725A is activated, while a switch coupling pixel 700E to output channel 725A is deactivated. Similarly, a switch coupling pixel 700B to output channel 725B is activated and a switch coupling pixel 700F to output channel 725B is deactivated in the preceding example. In another example, the controller 360 provides a control signal to the detector 720 identifying rows of the array of pixels 700 including pixels 700B, 700C, 700D, and 700E; hence, a switch coupling pixel 700A to output channel 725A is deactivated, while a switch coupling pixel 700E to output channel 725A is activated. Similarly, a switch coupling pixel 700B to output channel 725B is activated and a switch coupling pixel 700F to output channel 725B is deactivated in the preceding example. Switches coupling pixels 700C and 700D to output channels 725C and 725D, respectively, are also activated in the preceding example.

The output channels 725A, 725B, 725C, 725D coupled to pixels 700 in a specific column are also coupled to a sampling module 730A for the specific column, which sums digital signals received from pixels 700 of the specific column coupled to each output channel 725A, 725B, 725C, 725D by an active switch. For example, pixels 700A, 700B, 700C, and 700D are included in a set of pixels 700 identified by the controller 360, so the sampling module 730A receives digital signals output from pixels 700A, 700B, 700C, and 700D, while switches coupling pixels 700E and 700F to output channels 725A and 725B, respectively, are deactivated, so the sampling module 730A does not receive digital signals form pixels 700E and 700F. From the digital signals received from pixels 700 in a specific column coupled to output channels 725A, 725B, 725C, and 735D by activated switches, the sampling module 730A generates a bit stream describing a number of detections of a light beam emitted by a depth camera assembly (DCA) 340 including the detector 720 during a time interval by pixels 700 in the specific column coupled to output channels 725A, 725B, 725C, and 725D by activated switches. The bit stream generated by the sampling module 730A provides a representation of a temporal histogram of different rows in the specific column of light from the DCA 340 incident on pixels 700 of the specific column coupled to output channels 725A, 725B, 725C, and 725D by activated switches. Bit streams corresponding to each column including pixels 700 in the set of pixels 700 are similarly generated by sampling modules 730 corresponding to each column including pixels 700 in the set of pixels 700.

For purposes of illustration, FIG. 7B shows sampling modules 730A, 730B corresponding to two columns of the array of pixels 700 comprising the detector 720. However, a sampling module 725 is associated with each column of the array of pixels 700. This allows the detector 720 to generate a temporal histogram Each sampling module 730A, 730B is coupled to an addition module 735, which combines the bit steams corresponding to each column including pixels 700 in the set of pixels 700 specified by the controller 360. By combining combines the bit steams corresponding to each column including pixels 700 in the set of pixels 700, the addition module 735 generates a digital representation of a combined histogram describing a number of detections of a light beam emitted by a depth camera assembly (DCA) 340 including the detector 720 during a time interval by pixels 700 in the set of pixels 700. The digital representation of the combined histogram is provided from the addition module 735 to the controller 360 to determine depth information of an object in the local area surrounding the DCA 340 that reflected the light beam emitted by the DCA 340.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
a transmitter configured to illuminate a local area with outgoing light;
a receiver configured to capture, in accordance with receiving instructions, one or more images of the local area including reflected light comprising portions of the outgoing light reflected from one or more objects in the local area, the receiver comprising:
an array of single photon avalanche diode (SPAD) pixels, each SPAD pixel of the array configured to capture light from the local area including portions of the outgoing light reflected from one or more objects in the local are at each of one or more time instants,
switches coupled to each SPAD pixel of the array,
an aggregator coupled to the switches, the aggregator configured to sum current received from SPAD pixels coupled to the aggregator by activated switches for each time instant to generate an analog output signal and to convert, for each time instant, the analog output signal into a digital timestamp signal associated with a time instant, the aggregator comprising a comparator coupled to each switch coupled to a SPAD pixel of the array and configured to combine current generated by SPAD pixels coupled to activated switches and to generate a specific value in response to the combined current exceeding a threshold value and a time to digital converter (TDC) coupled to the comparator and configured to generate a digital representation of a time when the time to digital converter received the specific value from the comparator; and
a controller coupled to the receiver, the controller configured to provide receiving instructions to the receiver including a control signal to switches coupled to a set of SPAD pixels of the array to activate the switches coupling the set of SPAD pixels to the aggregator.

2. The DCA of claim 1, wherein the controller is further configured to provide an alternative control signal to the receiver that deactivates the switches coupled to the set of SPAD pixels to decouple the set of SPAD pixels from the aggregator and that activates switches coupled to an alternative set of SPAD pixels of the array to couple the alternative set of SPAD pixels to the aggregator.

3. The DCA of claim 1, wherein the transmitter is included in a beam steering assembly including one or more steering elements configured to deflect one or more light beams generated by an illumination source within the local area, the illumination source positioned within a threshold distance of the receiver.

4. The DCA of claim 3, wherein the controller is coupled to the transmitter and configured to predict a region of the array of SPAD pixels onto which light reflected from the one or more light beams is incident based on a scanning angle of the transmitter and to transmit receiving instructions including the control signal to switches coupled to a set of SPAD pixels within the region to activate switches coupling the set of SPAD pixels within the region to the aggregator and to transmit an alternative signal to switches coupled to SPAD pixels outside of the region to deactivate switches coupling the SPAD pixels outside of the region to the aggregator.

5. The DCA of claim 1, wherein the TDC is further coupled to the controller and configured to provide the digital representation of the time when the TDC received the specific value from the comparator to the controller.

6. The DCA of claim 5, wherein the controller is further configured to determine depth information for one or more objects in the local area that reflected the outgoing light from the transmitter based on a time when the outgoing light was emitted from the transmitter and the time when the TDC received the specific value from the comparator.

7. The DCA of claim 1, wherein the control signal identifies rows and columns of the array of SPAD pixels coupled to switches to be activated.

8. The DCA of claim 1, wherein the control signal identifies pairs of a row of the array of SPAD pixels and a corresponding column of the array of SPAD coupled to switches to be activated.

9. The DCA of claim 1, wherein the receiver includes an imaging device having a focus that spreads reflected light comprising portions of the outgoing light reflected from one or more objects in the local area across a region of interest comprising a subset of SPAD pixels of the array.

10. A depth camera assembly (DCA) comprising:
a transmitter configured to illuminate a local area with outgoing light;
a receiver configured to capture, in accordance with receiving instructions, one or more images of the local area including reflected light comprising portions of the outgoing light reflected from one or more objects in the local area, the receiver comprising:
an array of pixels comprising a plurality of columns of pixels and a plurality of rows of pixels, each pixel including a single photon avalanche diode (SPAD) coupled to a comparator configured to generate a particular value in response to current generated by the SPAD included in the pixel from light incident on the SPAD exceeding a threshold value;
a set of output channels corresponding to each column of pixels, each comparator of a pixel of a column coupled to one output channel of the set of output channels via a switch;
a plurality of sampling modules, each sampling module corresponding to a column of pixels, a sampling module corresponding to the column coupled to the set of output channels corresponding to the column and configured to determine a sum of the particular value received from pixels in the column coupled to an output channel of the set of output channels by an activated switch; and
an addition module coupled to each of the plurality of sampling modules, the addition module configured to generate a temporal histogram by combining sums of the particular value received from each of the plurality of sampling modules; and
a controller coupled to the receiver, the controller configured to provide receiving instructions to the receiver including a control signal to activate switches coupling each pixel in a set of pixels to a corresponding output channel of the set of output channels.

11. The DCA of claim 10, wherein the control signal further deactivates switches coupling pixels not in the set of pixels to the corresponding output channel of the set of output channels.

12. The DCA of claim 10, wherein the controller is further coupled to the transmitter and configured to determine depth information for one or more objects in the local area that reflected the outgoing light from the transmitter based on a time when the outgoing light was emitted from the transmitter and the temporal histogram.

13. The DCA of claim 10, wherein the transmitter is included in a beam steering assembly including one or more steering elements configured to deflect one or more light beams generated by an illumination source within the local area, the illumination source positioned within a threshold distance of the receiver.

14. The DCA of claim 13, wherein the controller is coupled to the transmitter and configured to predict a region of the array of pixels onto which light reflected from the one or more light beams is incident based on a scanning angle of the transmitter and to transmit receiving instructions including the control signal to activate switches coupled to a set of pixels within the region to couple comparators of each pixel of the set to one of the set of output channels.

15. The DCA of claim 14, wherein the control signal further deactivates switches coupled to comparators of pixels outside of the region to decouple the comparators pixels outside of the region to the set of output channels.

16. The DCA of claim 10, wherein the controller is further configured to determine depth information for one or more objects in the local area that reflected the outgoing light from the transmitter based on a time when the outgoing light was emitted from the light generator and the temporal histogram.

17. The DCA of claim 10, wherein the control signal identifies rows and columns of the array of pixels coupled to switches to be activated coupling pixels in the identified rows and columns to corresponding output channels of the set of output channels.

18. A detector comprising:
an array of pixels comprising a plurality of columns of pixels and a plurality of rows of pixels, each pixel including as single photon avalanche diode (SPAD) coupled to a comparator configured to generate a particular value in response to current generated by the SPAD included in the pixel from light incident on the SPAD exceeding a threshold value;
a set of output channels corresponding to each column of pixels, each comparator of a pixel of a column coupled to one output channel of the set of output channels via a switch;
a plurality of sampling modules, each sampling module corresponding to a column of pixels, a sampling module corresponding to the column coupled to the set of output channels corresponding to the column and configured to determine a sum of the particular value received from pixels in the column coupled to an output channel of the set of output channels by an activated switch; and
an addition module coupled to each of the plurality of sampling modules, the addition module configured to generate a temporal histogram by combining sums of the particular value received from each of the plurality of sampling modules.

19. The detector of claim 18, wherein switches coupling comparators of each pixel of an identified set are activated to couple the comparators of each pixel of the identified set to a corresponding output channel of the set of output channels.

20. The detector of claim 19, wherein switches coupling comparators of each pixel not included in the identified set are deactivated to decouple the comparators of each pixel not included in the identified set to the corresponding output channel of the set of output channels.

* * * * *